April 4, 1950
L. A. MARIHART
2,502,468
AGRICULTURAL MACHINE AND APPARATUS
Filed Dec. 12, 1944
6 Sheets-Sheet 1
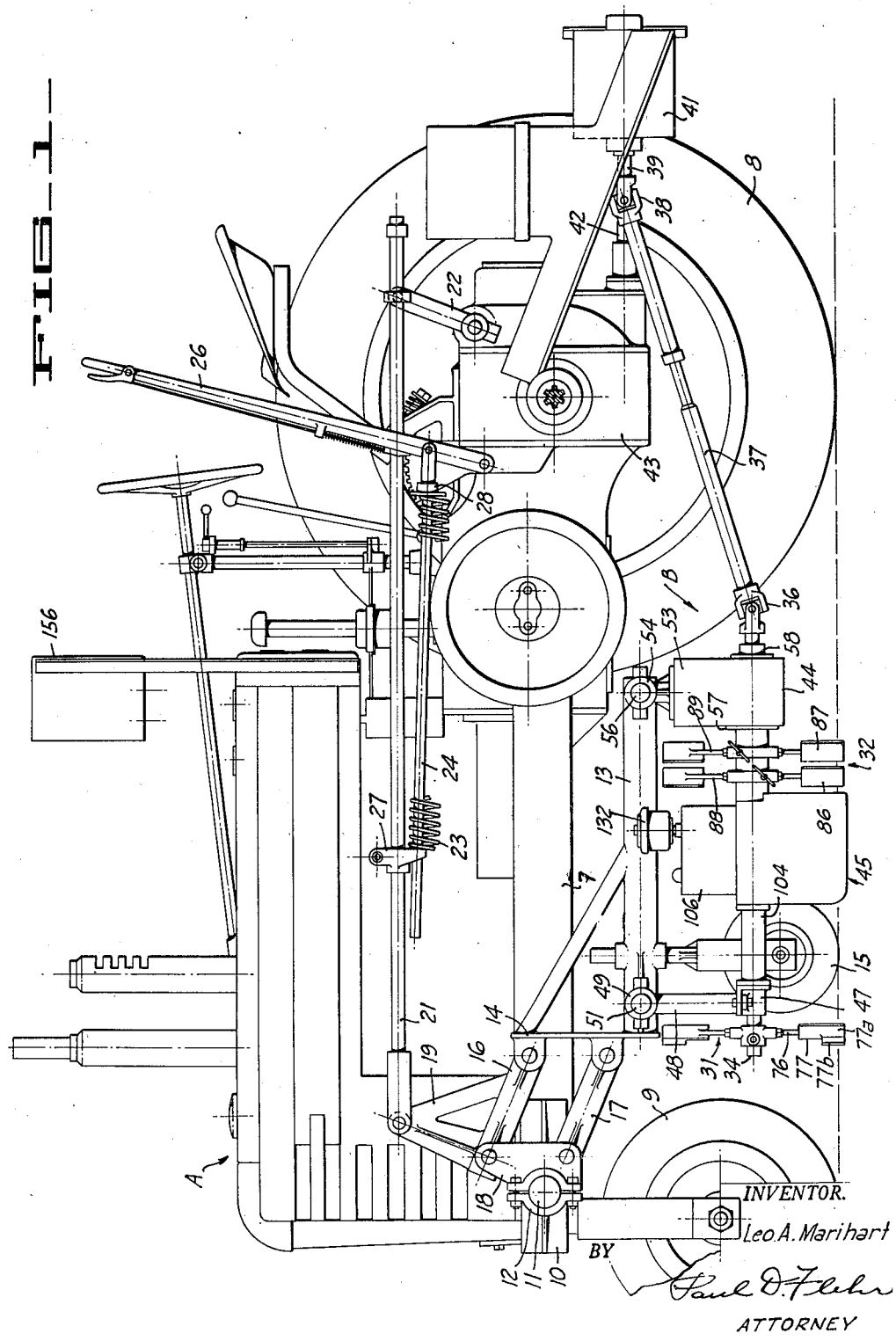
INVENTOR.
Leo A. Marihart
BY
Paul D. Flehr
ATTORNEY

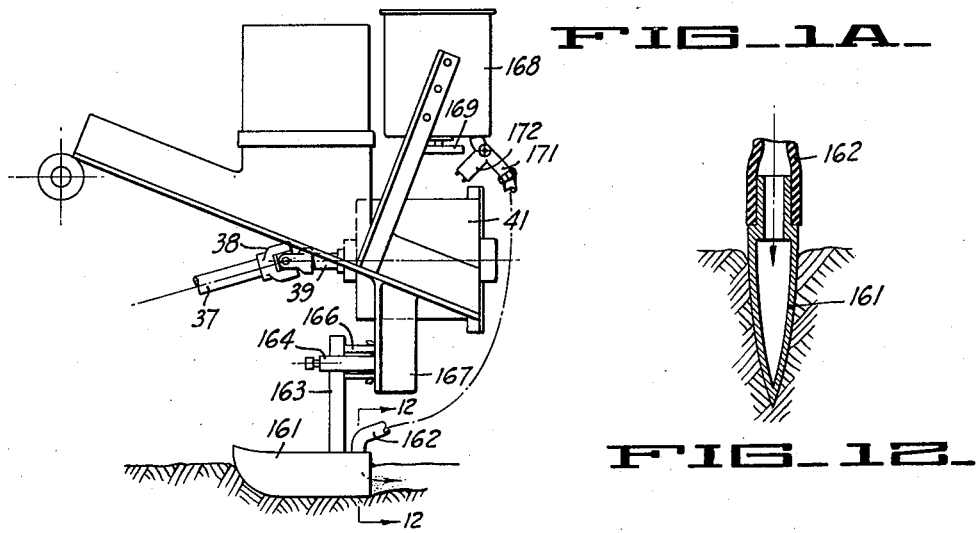
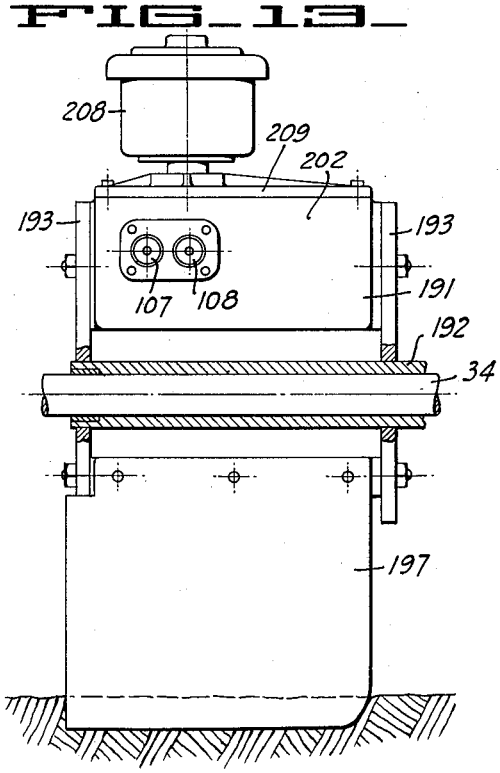
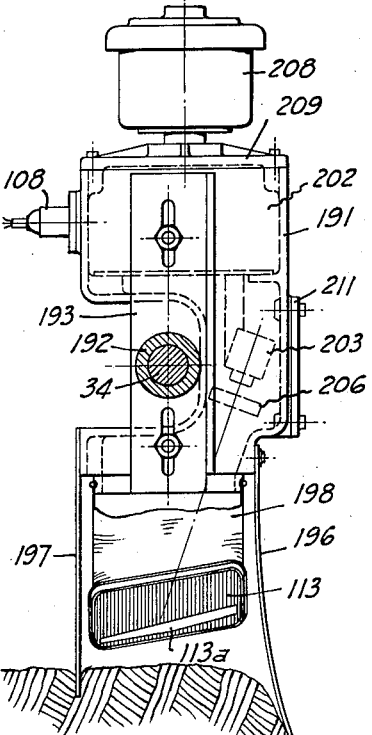
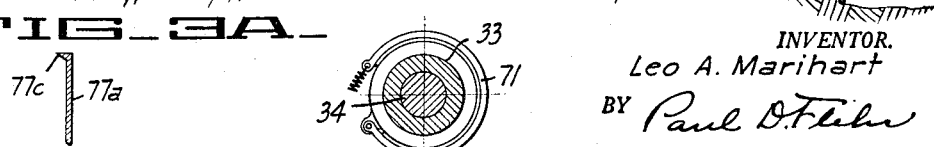

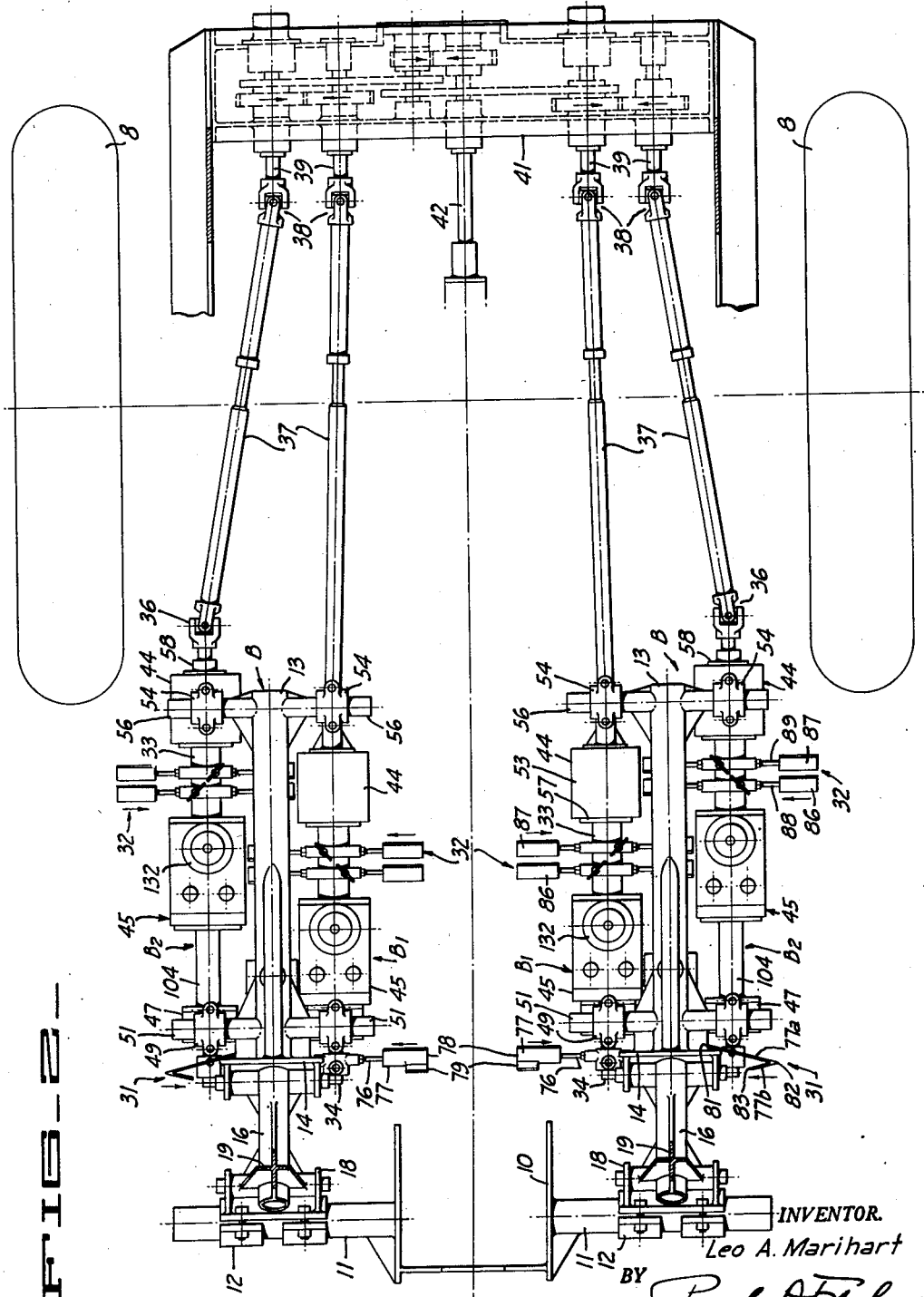

April 4, 1950   L. A. MARIHART   2,502,468
AGRICULTURAL MACHINE AND APPARATUS
Filed Dec. 12, 1944   6 Sheets-Sheet 4
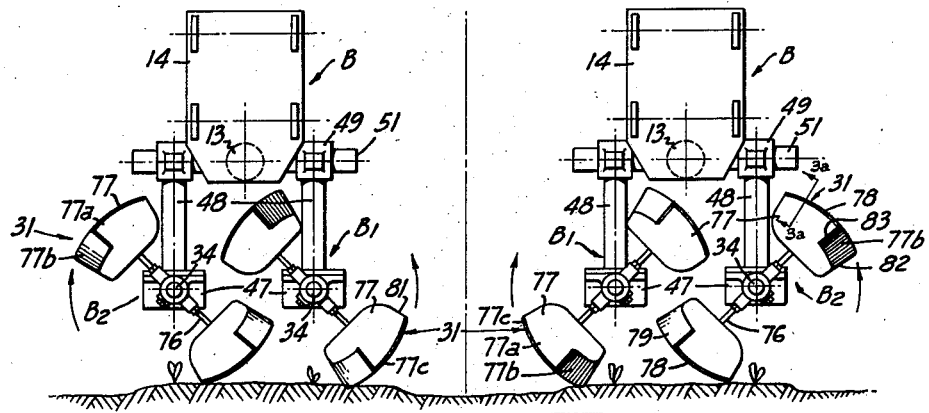
FIG_3_
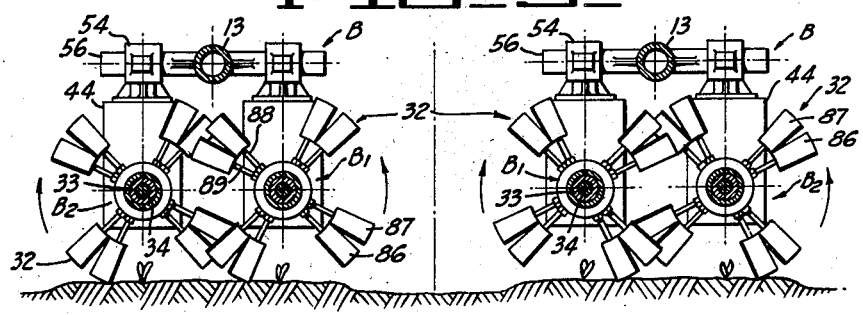
FIG_4_
FIG_5_   FIG_6_
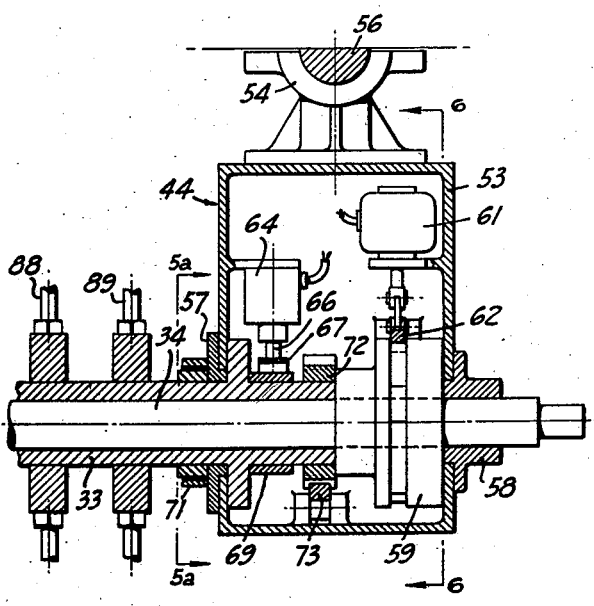
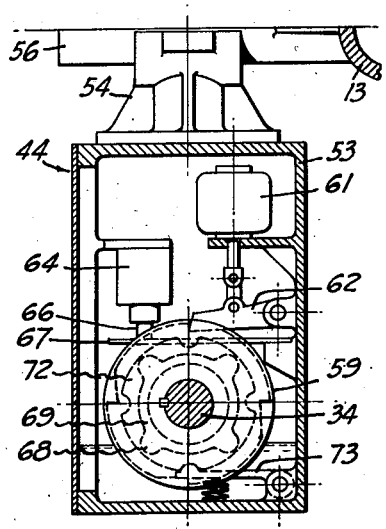
INVENTOR
Leo. A. Marihart
BY Paul O. Beeler
ATTORNEY April 4, 1950     L. A. MARIHART     2,502,468
AGRICULTURAL MACHINE AND APPARATUS
Filed Dec. 12, 1944     6 Sheets-Sheet 5
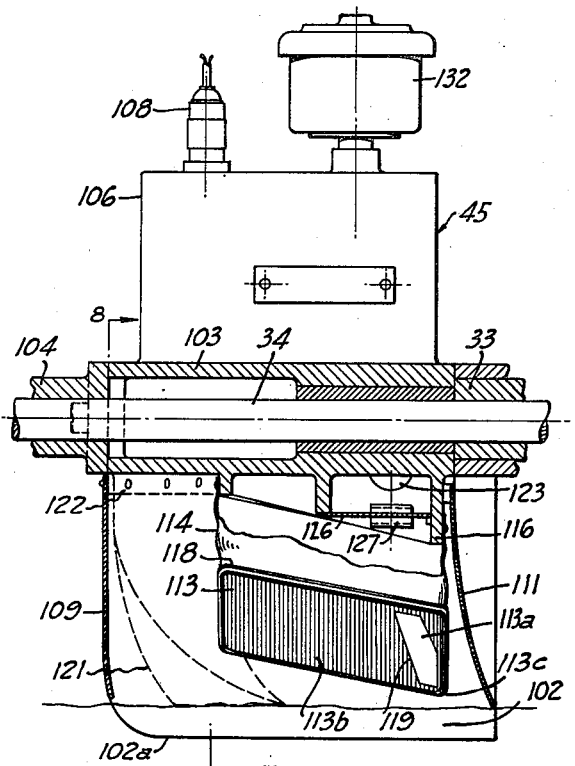
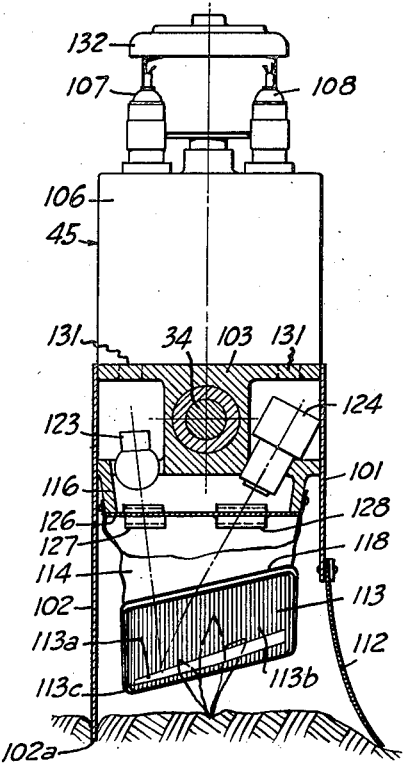
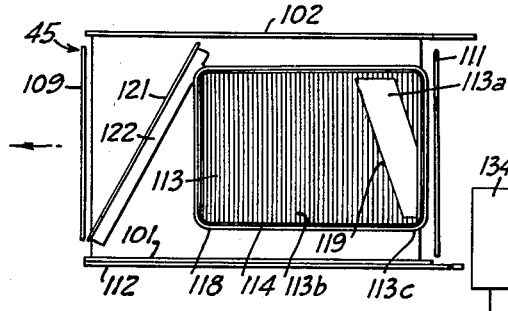
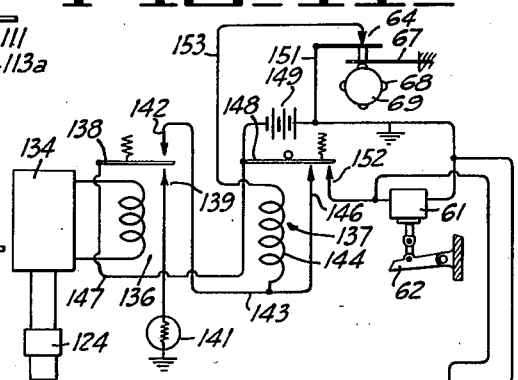
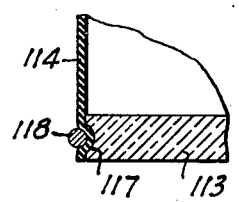
INVENTOR
Leo A. Marihart
BY Paul D. Fehr
ATTORNEY April 4, 1950        L. A. MARIHART        2,502,468
AGRICULTURAL MACHINE AND APPARATUS
Filed Dec. 12, 1944        6 Sheets-Sheet 6
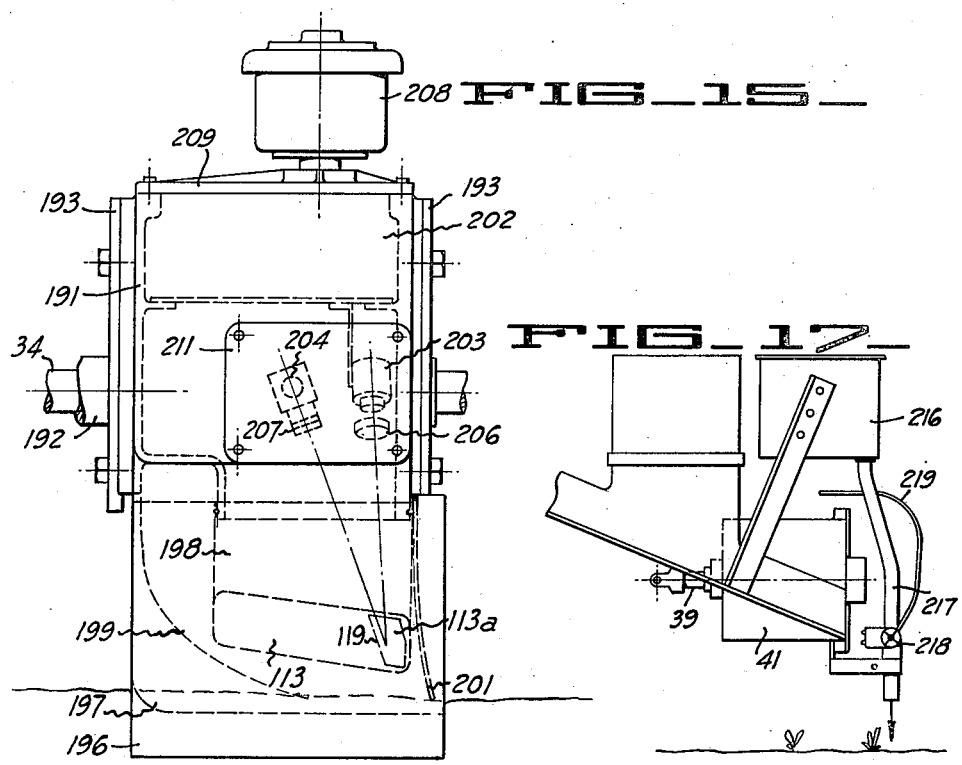
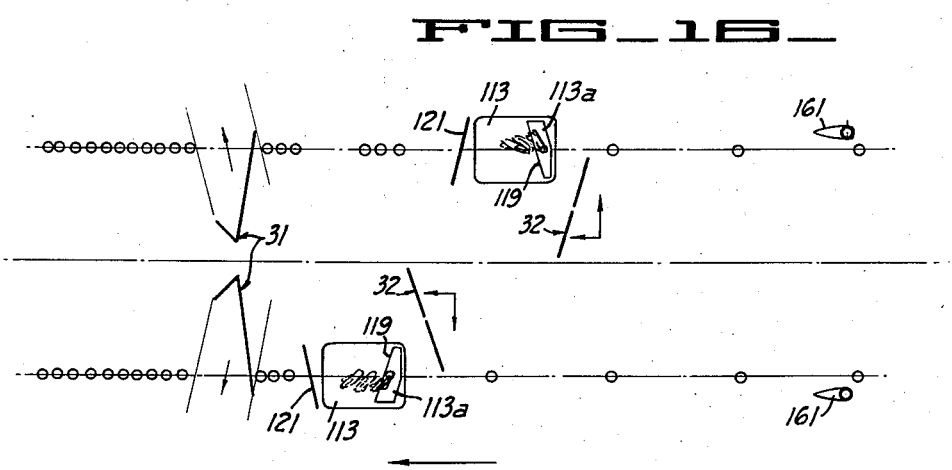
INVENTOR.
Leo A. Marihart
BY Paul O. Fehr
ATTORNEY Patented Apr. 4, 1950

2,502,468

UNITED STATES PATENT OFFICE 2,502,468

AGRICULTURAL MACHINE AND APPARATUS

Leo A. Marihart, Monterey County, Calif.

Application December 12, 1944, Serial No. 567,852

17 Claims. (Cl. 250—239)

This invention relates generally to machines and methods making use of a photoelectric or light sensitive device for controlling agricultural tools or like operations responsive to light received from plants.

In my Patent No. 2,400,562, issued May 21, 1946, I have disclosed an agricultural machine making use of a frame adapted to travel along a row of plants and having ground engaging cutters or hoeing devices carried by the frame and adapted to operate upon one or more plant rows. The cutters are controlled by light sensitive or photoelectric means whereby actuating responses are secured from selected plants in a desired condition of growth. Such a machine can be arranged to perform various functions including particularly thinning out plants to leave properly spaced selected plants, and eradication of weeds as the desired plants approach maturity. A portion of the means employed to control the hoeing operations as disclosed in said patent consists of a device or huddler which carries the photoelectric or light sensitive means in conjunction with a source of light. This device is caused to pass over the row of plants being operated upon and the light sensitive means is sighted upon certain portions of the plants to give a response indicative of the position of the root of the plant. The response thus obtained is utilized to trip certain mechanism for controlling the hoeing operations.

In equipment such as generally described above it frequently happens that conditions are such as to cause a considerable amount of dust within and about the huddler. This tends to interfere with obtaining a proper light response from the plants, particularly in that it diffuses the light, and it settles upon the various light transmitting windows or lenses employed to thus decrease their transparency.

It is an object of the present invention to devise apparatus of the above character which is so constructed that dust does not materially interfere with its intended operation.

More particularly it is a further object of the invention to provide a huddler or like type of device for passing along a row of plants, which will make possible an unobstructed view of portions of the plants by the photoelectric or light sensitive means, and which will protect the light transmitting windows or lenses of the equipment from accumulation of dust.

A further object of the invention is to provide novel means for operating upon a row of plants to secure a desired light response, and which will bend the plants over in such a manner as to facilitate an accurate light response indicative of the location of the plants, and for optimum automatic control of machine operations.

A further object of the invention is to provide a huddler or like device which can be operated under adverse conditions and over long periods of time without becoming clogged with vegetation or dirt.

A further object of the invention is to provide a novel machine for automatically controlling distribution of fertilizer to plants spaced apart in a row.

A further object of the invention is to provide a novel machine for controlling distribution of insecticidal material to spaced plants of a row.

Another object of the invention is to provide a novel type of machine for carrying out hoeing operations upon plant rows, the parts of which are adapted for mounting upon a standard farm tractor.

A further object of the invention is to provide a novel type of cutter for operating upon a row of plants, and which is particularly effective in blocking out operations.

Further objects of the invention will appear from the following description in which the preferred embodiment has been shown in detail in conjunction with the accompanying drawing.

Referring to the drawing:

Fig. 1 is a side elevational view, illustrating a machine incorporating the present invention.

Fig. 1a is a side elevational view showing parts of an automatic fertilizer distributor which can be applied to Fig. 1.

Fig. 2 is a plan view of certain working parts of the machine shown in Fig. 1.

Fig. 3 is a detailed end view showing the construction and operation of the blocking out cutters.

Fig. 3a is a detail taken along the line 3a—3a of Fig. 3.

Fig. 4 is a cross-sectional detail showing operation of the secondary cutters.

Fig. 5 is an enlarged section showing the clutching means for driving the secondary cutters, and parts associated with the same.

Fig. 5a is a cross-sectional detail taken along the line 5a—5a of Fig. 5.

Fig. 6 is a cross-sectional view taken along the line 6—6 of Fig. 5.

Fig. 7 is a side elevation, partly in cross-section, showing my novel huddler.

Fig. 8 is a cross-sectional view taken along the line 8—8 of Fig. 7.

Fig. 9 is a bottom plan view of the huddler shown in Fig. 7.

Fig. 10 is a cross-sectional detail illustrating a suitable connection between the light permeable wall and the resilient boot for carrying the same.

Fig. 11 is a circuit diagram of suitable wire connections for the electrical parts.

Fig. 12 is an enlarged cross-sectional detail taken along the line 12—12 of Fig. 1a.

Fig. 13 is a side elevational view partly in cross-section showing a modified form of huddler.

Fig. 14 is an end view, partly in section, showing the device of Fig. 13 and looking towards the left-hand end of the latter.

Fig. 15 is a view showing the device of Figs. 13 and 14 looking towards the opposite side of the device from that shown in Fig. 13.

Fig. 16 is a diagrammatic plan view illustrating the manner in which the machine operates.

Fig. 17 is a side elevational view showing an embodiment of the invention in which insecticidal material is delivered to the plants.

The machine illustrated in Fig. 1 has its principal operating parts carried by the frame 7 of a farm tractor A. The rear balloon tired wheels 8 of this tractor are driven, and the tractor is steered by turning the single front wheel 9. Such a tractor forms a convenient machine for carrying the working parts to be presently described, although it will be apparent that other types of tractors can be employed, or a special trailer or motor powered wheeled frame can be used where it is not desired to adapt the machine for mounting on standardized tractors.

A yokelike frame 10 is attached to the forward part of the tractor, and extending outwardly from this frame are the frame tubes or rods 11 which are engaged by the adjustable clamps 12. Attached to the clamps 12 are the assemblies B, each of which is made up of the operating units B1 and B2. In general the operating units are capable of operating on two adjacent plant rows and consist of cutters or hoeing devices in conjunction with light responsive means for controlling the same. In the detailed construction illustrated each of the units B is provided with a frame 13 having an upstanding bracket 14 attached to its forward end and carrying a supporting wheel 15. Each bracket 14 is pivotally attached by parallel links 16 and 17 to a plate 18 carried by the associated clamp 12. By this means of attachment each frame 13 is maintained in a substantially horizontal position but may move in a general vertical direction relative to the frame 10.

In order to enable manual raising of the frames 13 during periods when it is not desired to operate the cutters, as for example when the machine is being transported from one locality to another, one of the upper links 16 is provided with a crank arm 19. This arm is pivotally attached to the forward end of a rod 21, which extends rearwardly of the machine, and has an operative connection with an arm 22 of a suitable operator, such as one commonly furnished on tractors and operated hydraulically. To generally counterbalance the weight of frames 13 and parts carried by the same for a purpose to be presently explained, a compression spring 23 is provided which is positioned on rod 24. The rear end of this rod is pivotally attached to the adjustable hand lever 26, and the forward end is slidably retained by a clamp 27 which is secured to rod 21. The forward end of compression spring 23 presses upon clamp 27, while its rear end engages a collar 28 fixed on rod 24. Thus spring 23 tends to lift upwardly upon frames 13, through links 16, and the extent to which the weight of the parts is counterbalanced can be varied by adjusting the setting of lever 26. When it is desired to elevate the frames and associated parts to an out-of-the-way position, one operates lever 22, as by means of a hydraulic actuator, thereby forcing rod 21 forwardly to lift the frames 13.

Each of the operating units is provided with primary or blocking cutters designated generally at 31, and secondary or fine hoeing cutters 32. These cutters are driven by the telescopically disposed shafts 33 and 34. Power is applied to each of the shafts 34 by suitable means such as extended drive shafts and gearing driven from the motor of the tractor. Thus the rear end of each of the shafts 34 connects through a universal joint 36 to the extensible drive shaft 37, which in turn has its rear end connected through universal joint 38 with a stud shaft 39 extending from the gear box 41. All of the shafts 39 are connected together by suitable gearing and to the forwardly extending drive shaft 42 (Fig. 2). This shaft receives power from the tractor transmission 43. The gearing is such that each of the shafts 39, and thus the shafts 34, are driven at the same speed, and because there is a direct connection with the transmission of the tractor, this speed is synchronous with the forward speed of the tractor. The two shafts 34 for the adjacent units B1 and B2 are driven in opposite directions, for reasons which will be presently explained. Preferably the gearing in box 41 includes interchangeable elements to vary the drive ratio whereby the speed of rotation of shafts 39 can be adjusted with respect to the forward speed of the machine.

As shown in Fig. 1 the telescopic shafts 33 and 34 of each unit extend through devices 44 and 45, with devices 44 forming bearings for the rear ends of the shafts. The forward end of each shaft 34 is journaled in a suitable sealed bearing 47, which in turn is carried at the lower end of a support arm 48. Each of these support arms has its upper end secured to an adjustable clamp 49, which in turn is secured to one of the two laterally extending members 51 of each frame 13. By adjusting the setting of clamps 49 it will be apparent that the distance between centers of the shafts for adjacent units B1 and B2, can be adjusted as desired, to suit different distances between the centers of plant rows.

Each of the structures or devices 44 consists of a rigid metal housing or box 53 (Fig. 5) having its upper end attached to the clamp 54. These clamps are in turn adjustably carried by the laterally extending frame members 56, thereby enabling adjustment between the centers of the shafts of units B1 and B2, the same as previously described for the clamps 49. The front and rear side walls of the box 53, through which the shafts extend, are provided with a bearing 57 for shaft 33 and a bearing 58 for shaft 34. Within the box there is a suitable clutch 59, which in this instance is of the one-quarter revolution type, and which is adapted to be tripped by energization of the electrical solenoid 61. It will be evident that the clutch may be one of any number of commercial types provided it is sufficiently fast and positive. For this reason no specific detailed construction is shown, except that a trip lever or pawl 62 is indicated, and which is connected to the operating member of the solenoid 61.

It will be understood that one element of the clutch 59 is keyed to the shaft 34, while the other element directly connects with the outer tubular shaft 33. Therefore when the clutch is tripped by operating solenoid 61 while shaft 34 is being rotated, the two shafts rotate in unison for one quarter revolution.

Box 53 also serves to conveniently house an electrical switch 64, the purpose of which will be presently explained. The operating member 66 of this switch engages a spring tongue 67 which in turn is engaged by the spaced lugs or cam elements 68 on the cam ring 69. This ring is directly mounted upon the shaft 33. Four lugs 68 are provided, whereby for each operation of the solenoid 61 to rotate shaft 33 one quarter revolution, the contacts of switch 64 are opened after initial rotation and are closed when shaft 33 comes to rest. This serves to reset the circuit which supplies current to the solenoid 61. It is desirable that box 53 be liquidtight and that it contain a quantity of lubricating oil. Adjacent one end of the box it is desirable to provide a tensioned friction band 71 (Fig. 5a) which engages the adjacent peripheral surface of the shaft 33 for the purpose of applying a constant friction to tend to minimize backlash and overthrow. Shaft 33 within the box 53 is shown provided with a collar 72 which has four depressions corresponding to the four positions occupied by shaft 33 when the shaft is at rest. These depressions are engaged by the spring pressed detent lever 73. Such engagement serves to retain shaft 33 in one of four predetermined stationary positions during periods when the clutch is disengaged, and insures accurate commencement of a cut from a predetermined angular position of the cutter when the clutch is tripped.

As previously stated shaft 34 is rotated continuously as the machine is advanced. Each cutter 31 is constructed to perform blocking out operations, that is a cutting or chopping away of spaced areas in a plant row separated by intervals in which clumps of plants are left. Each cutter 32 performs operations upon the remaining clumps of plants for the purpose of removing all except a selected one of the plants. The blocking out cutter 31 illustrated consists of outwardly extending arms 76 which carry cutting blades 77 at their outer ends. In general the blades are so constructed that taking into account the speed of rotation and the forward speed of the vehicle, they cut through an area or path of the desired length and depth, leaving clumps of a desired length and at a desired spacing apart. While various types of blades can be used for this purpose, the type illustrated is deemed desirable and gives good results, particularly where the ground is comparatively dry. Briefly it consists of two blade portions 77a and 77b. The larger or main portion 77a has a lower lip 77c which is sharpened to form a cutting edge. The outer edges 78 and 79 of these blade portions perform the cutting operation, and they are contoured on a curvature having the axis of shaft 34 as the center of its radius. The corner or edge 81 of the blade portion 77a, is first to engage the ground, while the other end 82 can be termed the trailing portion of the blade, and is last to leave the ground. Blade portion 77b is attached to the trailing edge 82 (Fig. 2) so that the two blade portions are disposed with each other in the form of a V. The forward edge 83 forms the forward shoulder of the cut and insures a relatively clean and well defined shoulder, which is advantageous for reasons to be presently described. Because there are two such blade structures for each blocking out cutter, a cut is made for each half revolution of the corresponding shaft 34.

When the soil is comparatively wet single blade-like portions 77a are desirable, and can be made to proper dimensions to cut over the desired area. Lips 77c are also omitted under wet conditions.

Each cutter 32 preferably utilizes four sets of cutting blades, each set consisting of the two blades 86 and 87 carried by the radial arms 88 and 89. When a set of these blades takes a cut across a row over which the machine is traversing, a plant which one desires to leave standing may remain, provided the cutter is timed so that the blades 86 and 87 pass in front and to the rear of the selected plant. These blades are staggered or spaced whereby the direct spacing between them is greater than the effective gap between their areas of operation on the ground during operation of the machine, thus tending to avoid lodging of clods or rocks between the blades. For heavy weedy field conditions these cutters may likewise be provided with lips like 77c (Fig. 3a).

Fig. 2 illustrates a suitable positioning for the cutters and for the devices 44 and 45 utilized in conjunction with the same. For each of the assemblies B the adjacent cutters 31 are disposed side by side, but the blades are displaced angularly in order not to directly interfere with each other, and the drive shafts for the same are rotated in opposite directions. Cutters 32 of adjacent units B1 and B2 are staggered one behind the other in order to avoid interference. Each unit 45, which includes the light sensitive means, is disposed directly in front of its corresponding cutter 32. Assuming that two rows of plants are provided for each plant bed, and that furrows are provided between the beds substantially as shown in Figs. 3 and 4, it is desirable that the cutters engage the ground moving in such a direction as to displace dirt and eradicate plants into the furrows, substantially as indicated in Figs. 3 and 4. It will be evident that the number of operating units can be varied depending upon requirements and conditions. For example in some instances a single operating unit is practical and convenient to employ, particularly for small scale growing operations.

It will be evident that under many soil conditions operation of the cutters causes considerable dust which would normally interfere with equipment making use of lenses, transparent windows or the like, to secure a light response from the plants. The novel device 45 illustrated in detail in Figs. 7 to 9 inclusive is constructed in such a manner that it is not detrimentally affected by dust conditions. This device consists of an enclosure formed with side walls 101, 102, made of suitable sheet metal, and secured at their upper edges to the casting or like body 103. At its forward end body 103 is attached to a tube 104 (see Fig. 1) which in turn is attached to the lower end of the support 48. Above the body 103 there is a closed metal box 106 which can serve to house certain electrical parts such as an electronic amplifier for the photoelectric unit, together with a relay and magnetic switch. Electrical cords 107 and 108 are shown connected to box 106, and serve to make the necessary electrical connections. Daylight is excluded from the interior of the enclosure by suitable means such as a depending flexible rubber flap 109, which extends between the walls 101 and 102 at the forward end of the device, and a second depending flexible flap 111 which is positioned at the rear end of the device. Such exclusion of daylight is deemed necessary where the light sensitive cell and the electrical system associated with the same is affected by extraneous daylight to prevent or interfere with the desired light response. When the machine is to operate over raised beds it is desirable that at least the lower portion of wall 101 be a flexible apron 112, whereby this apron may drape over the side shoulder of a plant bed. The lower edge 102a of wall 102 acts like a runner in that it is passed through the earth along the top surface of the plant bed. When no raised beds are encountered both side walls may be rigid plates or both may be flexible aprons or flaps.

Between the walls 101 and 102 there is a plate-like member 113, preferably made of glass or glass-like material. In this instance the plate is rectangularly contoured, and it is yieldably supported by the boot 114. The boot is formed of suitable flexible material such as resilient rubber, and its upper end embraces and is clamped upon a rib 116, which is attached to and formed integral with the lower side of casting 103. The lower end of the boot 114 is suitably attached and sealed with respect to the periphery of the plate 113. A suitable attachment for this purpose is shown in detail in Fig. 10. Briefly the periphery of the plate is provided with a shallow groove 117 into which the walls of the boot are pressed by the surrounding wire or cord 118. A portion 113a of the plate 113 is transparent or light permeable, or in other words it is capable of transmitting light in a manner to be presently described. The remaining portion 113b is opaque or has such light transmitting characteristics that light passed through the same has no effect upon the photoelectric unit. As shown in Fig. 9 the transparent portion 113a is in the form of a narrow transparent slot, having a leading edge portion 119 (or rather the line of demarcation between the transparent and opaque portions) which is substantially linear and inclined to the direction of movement of the device, as will be presently described. Instead of masking directly upon the upper surface of the plate to form the transparent portion 113a, a mask may be spaced from the plate, that is intermediate the plate and the source of light and photoelectric cell to be presently described.

The boot 114 is dimensioned so that instead of positioning the plate 113 in a horizontal position, it is tilted or disposed at an angle. The forward end is raised with respect to the trailing end, as shown in Fig. 7, and in addition it is desirable that the edge nearest the furrow (Fig. 9) is tilted upwardly relative to the inner edge. This places the rear corner 113c farthest from the furrow, and closest to the ground. In practice this corner may continuously or occasionally drag upon the ground. The manner in which plate 113 operates upon plants of a row will be presently described in detail. It can be briefly pointed out however with reference to Fig. 8 that the plate passes over a row of plants, directly in contact with the same, and the angle to which the blade is tilted causes the plants to be bent over both forwardly in the direction of movement of the machine, and laterally of the row towards the furrow. While so bent over the bent over stems of the plants are visible through the transparent portion 113a, and enable a light response. The general direction of the plants when fully bent over is at a minor angle to the line of demarcation 119 between the transparent and opaque portions of the plate 113.

In order to aid bending over the plants in the desired manner, whereby they are properly positioned when passing beneath the plate 113, I employ another resilient flap 121 which has its upper end suitably mounted, as by means of the rib 122, and which in general is disposed in advance of the plate 113 and boot 114. Flap 121 can be made of suitable resilient material, such as fabric reinforced rubber, and it is disposed at an inclination whereby it tends to bend over the plants towards the adjacent furrows, in addition to bending the plants over forwardly in the direction of travel of the machine. In order to illuminate portions of plants passing beneath and in contact with the transparent plate portion 113 suitable means such as a light bulb 123 is mounted above the plate 113, as for example within the body 103 as illustrated. Likewise carried by the body 103 there is a suitable photoelectric unit or device 124, which for example can consist of a conventional photoelectric tube. Below the light and the photoelectric unit there is suitable means such as a wall 126, which serves to carry the lens and filter mountings 127 and 128. The lenses carried by mounting 127 can include a suitable lens combination for generally focusing the light upon the transparent portion 113a, and in addition it preferably includes a suitable filter, such as a colored filter for color discrimination and a filter of the Polaroid type. The lens of mounting 128 may likewise include lens elements serving to generally focus light received from portion 113a upon the photoelectric tube, and in addition one can employ one or more filter elements, such as a Polaroid element and one or more color filters. In this connection it may be explained that the use of polarized light has been found desirable because it serves to minimize or eliminate reflections such as might otherwise be received from dew or moisture on the plants. A colored filter, particularly a deep red filter, has been found desirable because it makes possible a response from the relatively light colored stem portions of plants as distinguished from the greener leaf portion.

In order to facilitate limited upward movement of the plate 113 against the resiliency of the boot 114, it is desirable that the interior of the boot be vented to the atmosphere. For this purpose the interior of the boot 114 has been shown in communication with the spaces about light 123 and photoelectric unit 124, and with the interior of box 106 through one or more ports 131. The interior of box 106 is in turn vented to the atmosphere through the air filter or cleaner 132. This filter may be any one of a number of well known types, designed to efficiently remove dust from the air and the electrical parts within box 106. Thus the air within the apparatus and particularly above the plate 113 and surrounding the lenses, filters, photoelectric tube, and amplifier, is kept clear of dust particles.

Fig. 11 illustrates suitable electrical connections for the various electrical parts. Photoelectric device 124 connects to the input of the electronic amplifier 134, the output of which is connected to the coil of a relay 136. This relay is associated with a magnetic switch 137 which has a lock-out feature to insure reliable and positive operation of the solenoid 61. Amplifier 134 is preferably constructed and adjusted to normally supply current through the winding of relay 136, but to interrupt such current flow when the photoelectric device 124 receives a light response. Thus the biased armature 138 of this relay is normally closed. The forward contact 139 connects with a signal lamp 141 and to ground, whereby normally the signal lamp is illuminated, but is extinguished when a light response is received. The back contact 142 of the relay connects with conductor 143, which in turn connects to one terminal of the coil 144 of switch 137, and to the forward contact 146 of this switch. Armature 138 of the relay is connected by conductor 147 to the armature 148, and to one side of the battery 149. The other side of this battery connects by conductor 151 to one element of the switch 64, and to one side of the solenoid 61. The other side of solenoid 61 connects to contact 152 of switch 137, and the other element of the switch 64 is connected by conductor 153 to the coil 144.

With the electrical circuit described above, upon receiving a light impulse, current in the coil of relay 136 is immediately reduced to a value sufficient to cause opening movement of armature 138, thus closing the armature upon contact 142. This completes an energizing circuit for the coil 144 which can be traced from armature 138 through contact 142, conductor 143, coil 144, conductor 153, switch 64, conductor 151, battery 149, conductor 147, back to armature 138. Coil 144 is thereby immediately energized to cause closing of armature 148, with the result that this armature closes upon contacts 146 and 152. Closing of contact 152 completes an energizing circuit for solenoid 61 which can be traced from this contact to the solenoid, from the solenoid to battery 149, and from thence to the armature 148. Closing of contact 146 completes a holding circuit for the coil 144, which can be traced from this contact through armature 148, battery 149, conductor 151, contact 64, conductor 153, coil 144 back to contact 146. Thus armature 148 is maintained closed and coil 144 continuously energized irrespective of the condition of relay 136. As has been previously explained upon energizing solenoid 61 the clutch with which this solenoid is associated is tripped to cause a quarter revolution turn of the fine or close hoeing cutter. Collar 89 rotates together with the fine or close hoeing cutter, and after rotation through a minor angle, such as 20°, contacts 64 are opened thus breaking the holding circuit for coil 144. As a result armature 148 is released and solenoid 64 deenergized.

It will be understood that each of the units B1, B2 has associated with it an electrical circuit as shown in Fig. 11. Amplifier 134, together with the relay 136 and switch 64 can be conveniently mounted within the enclosing box 106. Illuminating lamp 123 can be energized by any suitable type of electrical circuit, which preferably contains an adjustable rheostat for adjusting the current flow through the lamp and the degree of illumination. This rheostat together with accessory testing and indicating lamps and instruments used in conjunction with the electrical circuit, may be carried upon an instrument panel 156 disposed upon the tractor in convenient view of the operator, and is connected by suitable conductor cables to the electrical parts of devices 45. Adjustment of the illumination from lamp 123 is desirable in that it can be employed to adjust the machine for different sized plants. By noting signal lights 141 the operator can determine whether or not the photoelectric cells and associated amplifiers are operating.

In some instances it is desirable to interpose a time delay between the reception of a light response by device 124 and operation of the associated secondary cutter. Operation of relay 136 and switch 137 interposes a short time delay, but in some instances this may not be sufficient. Therefore suitable types of time delay devices can be inserted in the circuit in order to secure a fixed lapse of time between operation of amplifier 134 as the result of light being received by device 124, and the operation of the solenoid 61. If desired the precise time delay can be made dependent upon the speed of movement of the machine, as disclosed in my aforesaid Patent 2,400,562. Instead of interposing a time delay in the electrical circuit it is possible to construct the clutches or their tripping mechanism whereby a time delay occurs after solenoid 61 has been energized.

In addition to the machine described above, which can be utilized for such operations as thinning, weeding, and the like, it is desirable to provide means likewise operated automatically by a light response for the purpose of securing localized application of fertilizer to the plants. Means of this type is disclosed in Fig. 1a and includes a plurality of shoes 161, each of which is adapted to operate in the ground alongside a row of plants. Each shoe is in the form of a hollow runner, and is of the type commonly utilized for applying side dressings of powdered soluble fertilizer. The forward end of the shoe is pointed and the rear end is open for the sub-surface discharge of the powdered material. Near the rear end of the shoe there is a connection to a hose 162 through which the powdered fertilizer is applied. Suitable means is provided for attaching such shoes to the frame of the machine. Thus each shoe is shown attached to the lower end of a bar 163, and each bar is held as by means of clamp 164 by the spaced cross bars 166. The latter are shown attached at their ends to the depending frame members 167. A series of conventional powdered fertilizer feed bins 168 are shown mounted above the gear box 41, and these bins are provided with suitable agitating and feed means driven by the lower sprocket 169. The outlet hose or pipe 171 from the bin can be controlled by a solenoid operated valve 172, and as shown in Fig. 11 solenoid 172 is electrically controlled from the main circuit of the machine, whereby it receives electrical impulses each time the solenoid 61 is operated. A suitable time delay means is utilized whereby after a light response is obtained, there is a predetermined interval before operation of solenoid valve 172. When the solenoid valve is opened a predetermined amount of powdered fertilizer is delivered into the shoe to be deposited in the ground. The time delay and synchronization is such that the charge of fertilizer is deposited adjacent a plant left in the thinning operation. It will be evident that a fertilizing mechanism of this type makes possible concentrated application of fertilizer adjacent the roots of the plants left standing in the row, thus avoiding wasteful application of fertilizer in localities where no plants are growing.

The time delay means utilized between the main electrical circuit of the machine and the energizing circuit for the solenoid 172, may be any one of a number of conventional types, provided it has sufficient capacity to receive and store impulses to accommodate for the displaced location of the shoe 161, with respect to the cutters. One suitable means is illustrated diagrammatically in Fig. 11. It consists of a paper tape perforator 176 adapted to be operated by electrical impulses, and connected across the solenoid 61. The feed wheel of this perforator is indicated as driven by shaft 177, which also drives a contact wheel 178, and which shaft is driven from a moving element of the machine whereby movement of the tape is synchronous with forward movement of the machine. A brush or contact element 179 engages the tape passing over contact wheel 178, and thereby makes direct contact with the wheel through the perforations. Contact wheel 178 and brush 179 are connected to solenoid 172 in series with the battery 181. The paper tape 182 is fed continuously through the perforator 176 and continuously passes over the contact wheel 178. Perforations are placed in the tape each time the solenoid 61 is actuated. The location of these perforations is therefore in accordance with the location of the plants left by the cutters. Contacts made through the perforations to the wheel 178 for operating solenoid valve 172, therefore likewise occur in accordance with plant location, thereby enabling the fertilizer to be discharged through the shoe 161 alongside the plants which are left by the machine.

Instead of accurately controlling application of the powdered fertilizer in accordance with the location of the plants left by the thinning machine, it is possible to control application of fertilizer in accordance with operation of the blocking cutters. Thus a suitable contact can be synchronized with operation of the blocking cutters, whereby as the machine advances solenoid valve 172 will be operated at regular intervals in synchronism with the blocking cutters, to deliver charges of fertilizer in the general region formerly occupied by the clumps of plants left by the blocking operation. Such an arrangement can likewise be used where one may utilize the blocking cutters without utilizing the fine hoeing cutters or the electrical control in conjunction with the same.

An explanation of Fig. 16 will assist in understanding complete operation of the machine. The simplified diagrammatic elements indicated in this figure represent the elements of like numbering of the machine. The primary cutters 31 are indicated as engaging the ground while moving outwardly of the bed and toward the adjacent furrows. In cutting through the row of plants they eradicate plants over a predetermined interval. Assuming for example thinning operations upon young lettuce plants, the plants may be blocked out over spaces 9 inches in length, leaving clumps of plants over intervening intervals of about 3 inches. The remaining plants are next engaged by the flaps 121, which serve to bend the plants both forwardly in the direction of the vehicle and outwardly toward the adjacent furrow. Actually as previously described the flaps 121 extend somewhat underneath the plates 113 and may be pressed against the lower plate surface. As the plates 113 contact and pass over the plants, they are either retained or forced into a position in which they are bent over both forwardly and toward the adjacent side furrows, whereby stem portions appear below the transparent portion 113a. When a sturdy stem portion is seen, that is one having a sufficient light reflecting area and of proper color for operation of the photoelectric unit, the clutch 59 is tripped by energization of the solenoid 61, to activate the secondary cutters 32. These secondary cutters then cut across the region occupied by the remaining plants, and the timing is such that the plant from which a light response has been secured for operation of the clutch, is caused to pass between the individual cutting blades 32. Thus this plant, or possibly two plants growing quite close together, is left standing, while remaining plants are eradicated. Toward the rear of the machine the shoes 161 operate alongside the row of plants, and the impulses received and applied to the solenoid operated valve 172, serve to deliver fertilizer into the ground alongside the plants left standing.

As seen in Fig. 16 the inclination of lines 119 to the direction of travel is generally parallel to the direction of cut across the plant row. This serves to accommodate some misalignment of the machine with respect to the plant rows, without causing inaccurate cutting operation.

The above will make clear the fundamental mode of operation of the machine. In general it will be evident that fields in which my machine is to be utilized should be sown in accurately spaced rows, with the rows as straight as possible. When the seeds have germinated and the plants have reached a proper size for thinning, my machine is employed to take the place of the usual hand thinning operations. The machine is first lined up with the rows of plants upon which it is to be operated, and then as the machine moves forwardly at the rate of speed desired, with the blocking cutters rotating, frames 13 are lowered until the wheels 15 engage the ground to support the frames. The depth to which the cutters now operate is dependent somewhat upon the setting of the wheels 15 and upon the tension applied through the counter-balance springs 23. By adjusting the tension on these springs the load carried by the wheels 15 can be adjusted and this serves to adjust the depth of cut and to compensate for variations in soil conditions which affect the depth to which the wheels sink into the earth. In setting up the machine for different operations, it will be evident that the depth of cut may also be adjusted by adjusting the distance between the blades and the axis of the rotating shafts 33 and 34. When at rest the secondary hoeing cutters 32 assume an angular position in which all of the cutting blades clear the ground. As the devices 45 pass over the clumps of plants left by the blocking cutters, the bent over stem portions of plants in good condition reflect light to secure a response from the photoelectric unit, to thereby energize the clutch solenoid 61 in the manner previously described. For each actuation of a clutch solenoid the corresponding secondary cutters 32 rotate ¼ of a revolution. As previously described during such rotation two cutters pass across the ground to eradicate substantially all of the plants left standing by the blocking cutter, with the exception of a selected plant. Occasionally more than one plant, growing too closely together, will be left standing, but these groups can be readily thinned out by a simple manual cleanup operation. At the end of the rows the frames 13 are elevated to enable the cutters to clear the ground, and then the machine is turned for operation upon succeeding rows.

It will be evident that my machine is capable of various set-ups for different types of plants, different operating conditions, and the type of operations desired upon plants. Thus for thinning operations the machine can be used for such plants as lettuce, cabbage, cotton, broccoli and radish. After the plants have been thinned and have reached a fair degree of maturity, the machine can be utilized for weeding operations to eradicate undesired weeds between the plants. Such operations are carried out by removing the blocking out cutters 31, and by utilizing only the secondary hoeing cutters 32, after the cutting blades have been replaced by blades of large size in order to cover the complete distance between the plants.

In some instances one may not desire to utilize the secondary cutters and the electrical controls for the same, but may simply wish to carry out blocking operations by use of the cutters 31. In such event the secondary cutters can be removed or the electrical controls disabled. The blades of the blocking cutters can be adjusted to operate on areas of the desired length and differently dimensioned blades can be used for different operating conditions.

Many adjustments can be made to suit the machine to various operating conditions. For example the two assemblies B can be adjusted closer or farther apart, and also units B1, B2 can be likewise adjusted, thereby accommodating the machine to plant rows different distances apart. The blades of the various cutters can also be adjusted with respect to angularity and distance from axis of rotation.

As previously stated a particular feature of the unit 45 is that the lenses, filters and like optical equipment is not affected by severe dust conditions. This is because the light transparent or light transmitting portion 113a is being continuously wiped by the plants, and therefore is kept sufficiently clean at all times to transmit a light response. It has been found that the plate 113 will be kept wiped clear of dust irrespective of climatic, dust or plant conditions. Thus moisture conditions because of dew upon the plants will not cause encrustation or accumulation of films of dirt or dust, and the same is likewise true of oils or plant juices commonly found upon plant leaves. By reference to Fig. 16 it will be noted that the transparent portions 113a view the stems of the plants commencing from the root and traveling towards the leaves. In operations upon young lettuce plants it has been found that when a sturdy plant is view, it is only necessary for a small length of the stem to appear in view of the photoelectric unit, in order to secure a desired response. Inclination of the plants as they pass beneath the plates 113 facilitates viewing of the stems in the manner described, and at the same time facilitates operation of the secondary cutters with a minimum amount of damage to the selected plant. This is because the cutting blades of the secondary cutters progress in a resultant path (taking into account forward movement of the machine and rotation of the cutter), which is comparable to the angle to which the plants are bent. Thus the selected plant is already bent over at an angle corresponding generally to the direction of movement of the cutting blades upon opposite sides of the same.

Previous reference has been made to the fact that the cutting blades 77b upon the blocking cutters make possible a sharply defined shoulder at the forward end of the cut. Without such blade portions there is a tendency for dirt to pile up in front of the main blades 77a. Action of blades 77b materially aids in operation of the units 45, because it avoids thrusting dirt over the remaining clump of plants, which might interfere with proper viewing of the bent over stems. In addition the way is cleared in front of the clumps of plants in such a manner as to present optimum conditions for operation of devices 45.

It will be evident that the light transmitting portions 113a of the plates 113 are the portions which must be kept relatively clean to permit transmission of light. If desired these portions may be made of light transmitting material, such as glass, with the remainder of the plate 113 formed of other material, as for example metal or molded plastic.

Figs. 13 to 15 inclusive illustrate a modified form of electrical device to take the place of the device 45 of Figs. 1 to 3 inclusive. This device consists of a hollow casting 191 formed of suitable material such as aluminum, and cut away at one side to accommodate the shaft 34 and the surrounding pipe or tube 192. This tube is rigidly secured to the straps 193, which are adjustably attached to the ends of the casting, and also extends forwardly for rigid connection with the depending bracket 48. One side of the casting carries a flexible curtain or flap 196, which is disposed on the furrow side of the row of plants, and the other side of the casting carries a rigid metal plate 197. When trashy field conditions are encountered a flap may be used in place of plate 197, and in a field without raised beds rigid plates may be used on both sides. The bottom side of the casting between the flap 196 and the plate 197 carries the resilient boot 198, at the lower end of which is mounted the plate 113 as previously described. A rubber flap or apron 199 is also attached to the bottom side of the casting immediately in advance of the boot 198, and this flap is of sufficient length to drape down and extend beneath the forward opaque portion of plate 113. The flap is arranged and serves the same purpose as the flap 121 of Fig. 9. During operation it is pressed into contact with the lower side of the plate. At the rear end of the casting there is a depending flap 201 to aid in the exclusion of light. The lower end of this flap drags upon the ground.

The top part of the casting interior provides a chamber 202, within which is disposed such electrical parts as the electronic amplifier, relay 136 and switch 137. Below this compartment there is the photoelectric unit 203 and the light source 204. The location of these parts is relatively close together, and upon one side of a vertical plane passing through the row of plants. This tends to eliminate undesired reflections from the upper surface of the plate 113. In conjunction with the photoelectric unit 203 there is a suitable mounting 206 for lenses, filters, and the like, and a similar mounting 207 is provided in conjunction with a light source 204. At the top of the device there is an air filter 208 which connects through the top cover 209. Removable plate 211 facilitates access to the interior of the casting for changing filters, or for repairing or replacing of parts.

The advantage of the construction shown in Figs. 13 to 15 inclusive is that the device can be readily removed from the machine for repair or adjustment of the electrical parts. This can be done simply by unbolting the end plates 193 from the casting. A further advantage is that the vertical height of the device relative to the center line of shaft 34 can be adjusted simply by adjusting the location of plates 193 with respect to the casting. Such an adjustment is desirable to suit the machine to different types of plants and to different operating conditions.

The embodiment of the invention shown in Fig. 17 is for applying insecticidal material to the plants, such as a powder or dust. Thus the rear end of the tractor frame carries a series of bins 216 for the insecticide powder. A discharge hose 217 leads from each bin and has its lower end disposed in position to pass directly over the plants of a row. Opening and closing of this hose, to effect discharge or shut off of powder, is controlled by solenoid valve 218 which is connected to the circuit of Fig. 1 in place of or in parallel with solenoid 172. The valve parts of this solenoid can also control discharge from an air hose 219 which connects with a suitable source of air pressure. By means of this arrangement it is possible to control discharge of the insecticide powder in accordance with the location of the plants whereby instead of wasting the powder by continuing to discharge it over areas between the rows, it is delivered only upon the plants and preferably downwardly into the plant heart.

Subject matter disclosed but not claimed herein is disclosed and claimed in my co-pending application Serial Number 103,909, filed July 9, 1949.

I claim:

1. In apparatus for securing a light ray response from plants located in a row, a wall of light permeable material, means serving to support said wall for movement along the row of plants with its one side surface in wiping contact with the plants, means for illuminating the plants, and a light sensitive device disposed to receive light passing through the wall from the plants.

2. In apparatus for securing a light ray response from plants located in a row, a wall of light permeable material, means serving to support said wall for movement along the row of plants with its lower surface in wiping contact with the plants, means for illuminating the plants below the wall, and a light sensitive device located above the wall and adapted to receive light passing through the wall from the plants, the forward portion of the wall being raised with respect to the rearward portion.

3. In apparatus for securing a light ray response from plants located in a row, a wall of light permeable material, means serving to support said wall for movement along the row of plants with its lower surface in wiping contact with the plants, said wall presenting a tilted surface to the plants whereby the plants are caused to be bent over both in a forward direction and lateral to the longitudinal axis of the row, means for illuminating the plants beneath the wall, and a light sensitive device located above the wall and adapted to receive light passing through the wall from the plants.

4. In a machine for operating upon plants located in a row in accordance with a light ray response from the plants, a wall formed of light permeable material, means serving to support said wall for movement along the row of plants, means for yieldably supporting the wall for wiping contact with the plants, means for illuminating plants passing adjacent the wall, and light sensitive means disposed to receive light passing through the wall from the plants.

5. In a machine of the character described utilizing a light ray response from plants located in a row, a wall formed of light permeable material, means serving to support said wall for movement along the row of plants with its one side surface in wiping contact with the same, means for illuminating the plants passing adjacent the wall, a light sensitive device disposed to receive light passing through the wall from the plants, and mounting means serving to enclose said device and the other side surface of said wall to protect the same against dust.

6. In a machine of the character described utilizing a light ray response from plants located in a row, a frame adapted to be traversed along a row of plants, a rigid light permeable wall disposed adjacent the row of plants, a boot of flexible material having its one end attached to the edges of said wall, and means serving to support the boot from said frame whereby the wall is caused to traverse the row of plants with its exterior face in wiping contact with the same, the flexible walls of said boot enabling limited relative movement of the wall with respect to the frame.

7. In a machine of the character described utilizing a light ray response from plants located in a row, a frame adapted to be traversed along a row of plants, a light permeable wall disposed above the row of plants, a boot of flexible material having its lower edge attached to the periphery of the wall, means serving to mount the upper end of the boot to said frame, whereby movement of the frame longitudinally of the row of plants causes said wall to pass over the row of plants in wiping contact with the same, means located adjacent the upper end of the boot for illuminating plants passing below the wall, and a light sensitive device also located adjacent the upper end of the boot and serving to receive light passing through the wall from the plants.

8. In a machine of the character described utilizing a light ray response from plants located in a row, a frame adapted to be traversed along a row of plants, a light permeable wall disposed above the row of plants, a boot of flexible material having its lower end attached and sealed with respect to the peripheral edge of the wall, means serving to support the upper end of the boot from said frame, and a dust separator serving to vent the interior of the boot to the atmosphere.

9. In a machine of the character described utilizing a light ray response from plants located in a row, a light permeable wall adapted to be disposed above the row of plants, a boot formed of flexible material having its lower end attached to and sealed with respect to the peripheral edge of the wall, means serving to carry the upper end of the boot from said frame whereby when the frame is traversed along the row of plants, the wall is caused to wipe over the plants of the row, a light located adjacent the upper end of the boot and arranged to illuminate plants passing below the wall, and a light sensitive device likewise located adjacent the upper end of the boot and adapted to receive light passing through the wall from the plants, means for enclosing the light and said light sensitive device, the interior of said means being in communication with the interior of the boot, and a dust collector serving to vent the interior of the boot to the atmosphere.

10. In a machine of the character described utilizing a light ray response from plants located in a row, a light permeable plate, means supporting the plate whereby its lower surface is disposed substantially in a plane tilted to such a position that both its forward portion and one side portion are raised, whereby when the plate is traversed over a row of plants in wiping contact with the same, the plants are bent forwardly and simultaneously deflected sidewise of the row, means for illuminating plants passing below the plate, and a light sensitive device located above the plate and adapted to receive light passing through the plate from the plants.

11. In apparatus for securing a light ray response from plants located in a row, a rigid impervious platelike wall, means serving to support the plate for movement along the row of plants with its one side surface in wiping contact with the same, a forward portion of the wall being opaque and a rearward portion being light permeable, means for illuminating the plants, and a light sensitive device disposed to receive light passing through the light permeable portion of the wall.

12. In apparatus for securing a light ray response from plants located in a row, an impervious platelike wall, means serving to support the plate for movement along the row of plants with its one side surface in wiping contact with the same, said wall being tilted with respect to the horizontal whereby its forward portion is raised with respect to its lower portion and whereby its one side edge is raised with respect to the other side edge, the forward portion of the wall being opaque and a rearward portion of the wall being light permeable, the line of demarcation between the permeable and the opaque portions of the wall being at an angle to the direction of movement of the wall, means for illuminating the plants adjacent the plate, and a light sensitive device disposed to receive light passing through the light permeable portion of the wall from the plants.

13. In apparatus for securing a light ray response from plants located in a row, a platelike wall formed of glass and adapted to be moved along the row of plants with its one side surface in wiping contact with the same, a forward portion of the wall being masked to render the same substantially opaque, thereby leaving a rearward light permeable portion of the wall, means for illuminating plants adjacent the wall, and a light sensitive device disposed to receive light passing through the light permeable portion of the wall from the plants.

14. In a machine of the character described utilizing a light ray response from plants located in a row, a light permeable plate adapted to be moved along the row of plants, means supporting the plate whereby its lower surface is disposed substantially in a plane tilted to such a position that its forward portion is raised, whereby when the plate is traversed over a row of plants in wiping contact with the same, the plants are bent forwardly, means for illuminating plants passing below the plate, and a light sensitive device located above the plate and adapted to receive light passing through the plate from the plants.

15. In apparatus for securing a light ray response from plants located in a row, an impervious platelike wall having a light permeable area and adapted to be moved along a row of plants with its lower surface in wiping contact with the same, means serving to exclude daylight from the space below the wall, means for illuminating plants below the wall, and a light sensitive device disposed above the wall and adapted to receive light passing through the wall from the plants.

16. In apparatus for securing a light ray response from plants located in a row, an impervious wall having a light permeable area, the wall being adapted to be moved along a row of plants with its lower surface in wiping contact with the same, means serving to enclose the plate to exclude daylight from the space below the same, means for illuminating plants below the wall, a light sensitive device disposed above the wall and adapted to receive light passing through the wall from the plants, and a deflector disposed in front of the wall and adapted to cause plants engaged by the same to be bent over forwardly and towards one side of the row, before such plants are engaged by the wall.

17. In a machine for operating upon plants located in a row in accordance with a light ray response from the plants, a frame adapted to be traversed along the row of plants, a wall of light permeable material adapted to be moved over a row of plants with its lower surface in wiping contact with the plants, means forming a mounting and serving to carry the wall for such wiping contact, and means forming an adjustable connection between said mounting and the frame of the vehicle to enable vertical adjustment of the wall with respect to the ground surface.

LEO A. MARIHART.

REFERENCES CITED

The following references are of record in the file of this patent:

UNITED STATES PATENTS

| Number | Name | Date |
| --- | --- | --- |
| 821,815 | Muirheid | May 29, 1906 |
| 1,302,015 | Dewey | Apr. 29, 1919 |
| 1,776,830 | Chenault | Sept. 30, 1930 |
| 2,177,803 | Ferte et al. | Oct. 31, 1939 |
| 2,182,157 | McDermott | Dec. 5, 1939 |
| 2,199,066 | Bernstein | Apr. 30, 1940 |
| 2,207,097 | Logan | July 9, 1940 |